United States Patent
Gaportsin

(10) Patent No.: US 12,049,863 B1
(45) Date of Patent: Jul. 30, 2024

(54) PORTABLE HYDROELECTRIC GENERATOR OR ALTERNATOR AND SYSTEM AND METHOD OF GENERATING ENDLESS AND UNINTERRUPTED ELECTRICITY USING GRAVITY WATER FLOW

(71) Applicant: Iosif V. Gaportsin, Staten Island, NY (US)

(72) Inventor: Iosif V. Gaportsin, Staten Island, NY (US)

( * ) Notice: Subject to any disclaimer, the term of this patent is extended or adjusted under 35 U.S.C. 154(b) by 0 days.

(21) Appl. No.: 18/416,814

(22) Filed: Jan. 18, 2024

(51) Int. Cl.
| F03B 7/00 | (2006.01) |
| F03B 11/06 | (2006.01) |
| F03B 13/00 | (2006.01) |
| H02K 7/116 | (2006.01) |
| H02K 7/18 | (2006.01) |

(52) U.S. Cl.
CPC .............. *F03B 7/006* (2013.01); *F03B 11/06* (2013.01); *F03B 13/00* (2013.01); *H02K 7/116* (2013.01); *H02K 7/1823* (2013.01); *F05B 2240/917* (2013.01)

(58) Field of Classification Search
CPC .......... F03B 7/006; F03B 11/06; F03B 13/00; H02K 7/116; H02K 7/1823; F05B 2240/917
USPC .......................... 290/1 C, 1 D, 42, 43, 53, 54
See application file for complete search history.

(56) References Cited

U.S. PATENT DOCUMENTS

| 958,014 | A | * | 5/1910 | Schreiber | ................ F03B 7/006 415/5 |
| 966,041 | A | * | 8/1910 | McClung | ................ F03B 7/006 415/5 |
| 1,267,928 | A | * | 5/1918 | Speegle | .................. F03B 7/006 415/5 |
| 3,922,012 | A | * | 11/1975 | Herz | ..................... F03B 17/065 416/111 |
| 3,986,787 | A | | 10/1976 | Mouton, Jr. et al. | |

(Continued)

FOREIGN PATENT DOCUMENTS

| EP | 1731757 A1 * | 12/2006 | ............ F03B 17/063 |
| EP | 2162618 B1 * | 9/2012 | ............. B63B 21/50 |

(Continued)

*Primary Examiner* — Charles Reid, Jr.
(74) *Attorney, Agent, or Firm* — Law Offices of Leo Mikityanskiy, P.C.; Leonid Mikityanskiy

(57) ABSTRACT

The Portable Hydroelectric Generator or Alternator and System and Method of Generating Endless and Uninterrupted Electricity Using Gravity Water Flow is designed to be installed completely in a river, including a Π-shaped framed platform, placed on two pontoons, a paddle wheel located on the Π-shaped platform coupled with a gearbox, and a generator or alternator with two sleeves or muffs driven by the gearbox. The system is attached to the river bottom using three anchors and cables, connected to three hand winches, used to tighten or loosen the cables and adjust the position of the device. Electrical wiring from the device may be connected to a controller and an inverter for transferring electricity to the utility grid by electric cable. When the system is installed under waterfalls, the Π-shaped platform housing the device should be attached to a rocky cliff using two anchors and cables connected to two pivoting winches.

13 Claims, 13 Drawing Sheets

(56) References Cited

U.S. PATENT DOCUMENTS

| | | | | |
|---|---|---|---|---|
| 3,993,913 | A * | 11/1976 | Dickman | E02B 9/08 290/53 |
| 4,001,596 | A * | 1/1977 | Kurtzbein | F03B 17/063 416/85 |
| 4,280,789 | A * | 7/1981 | Graden | F03B 17/065 415/6 |
| 4,301,377 | A * | 11/1981 | Rydz | F03B 17/063 416/85 |
| 4,352,990 | A * | 10/1982 | Aucoin, Jr. | F03B 17/064 416/85 |
| 5,136,174 | A * | 8/1992 | Simoni | F03B 17/062 290/43 |
| 6,551,053 | B1 * | 4/2003 | Schuetz | F03B 17/063 416/169 R |
| 7,063,579 | B2 * | 6/2006 | Voves | F03B 17/064 440/3 |
| 7,105,942 | B2 * | 9/2006 | Henriksen | F03B 1/02 415/60 |
| 7,872,364 | B1 * | 1/2011 | Embree | F03D 3/068 290/43 |
| 8,120,196 | B1 * | 2/2012 | Neese | H02P 9/04 416/119 |
| 11,680,750 | B1 | 6/2023 | Gaportsin | |
| 2005/0017513 | A1 * | 1/2005 | Sipp | F03B 17/063 290/54 |
| 2007/0222219 | A1 * | 9/2007 | Peckham | F03B 17/063 290/1 R |
| 2009/0127861 | A1 * | 5/2009 | Sankrithi | F03B 13/264 290/54 |
| 2009/0322093 | A1 * | 12/2009 | Winius | F03B 17/063 290/54 |
| 2010/0084870 | A1 * | 4/2010 | Burcik | F03B 17/06 290/54 |
| 2010/0237625 | A1 * | 9/2010 | Dempster | F03B 7/00 290/54 |
| 2010/0237626 | A1 * | 9/2010 | Hamner | F03B 17/065 416/119 |
| 2011/0068580 | A1 * | 3/2011 | Petrounevitch | F03B 17/066 290/54 |
| 2013/0088015 | A1 | 4/2013 | Walton | |
| 2013/0241206 | A1 * | 9/2013 | Tkadlec | H02K 49/102 290/54 |
| 2013/0285383 | A1 * | 10/2013 | Belarbi | F03B 13/10 114/267 |
| 2014/0191509 | A1 | 7/2014 | Stauffer et al. | |
| 2015/0033722 | A1 | 2/2015 | Layton et al. | |
| 2015/0252776 | A1 * | 9/2015 | Van Rompay | F03B 17/063 290/54 |
| 2017/0234288 | A1 * | 8/2017 | Williams | H02K 7/1807 290/54 |
| 2018/0347538 | A1 * | 12/2018 | Gehrik | F03B 13/00 |
| 2021/0159825 | A1 * | 5/2021 | Bergman | F03B 15/08 |
| 2022/0220932 | A1 | 7/2022 | Schmidt | |

FOREIGN PATENT DOCUMENTS

| | | | | |
|---|---|---|---|---|
| WO | WO-0155589 | A1 * | 8/2001 | F03B 13/00 |
| WO | WO-2020185564 | A1 * | 9/2020 | B63B 1/04 |

* cited by examiner

F-F

VIEW A

A−A

VIEW C

VIEW B $\dfrac{C-C}{FIG.9}$

D–D

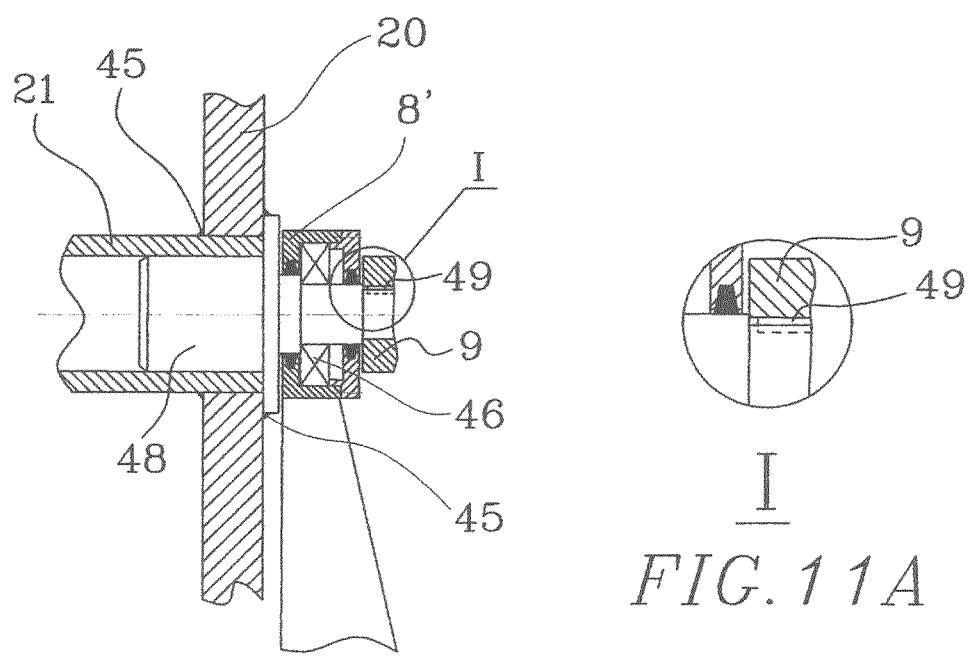

PORTABLE HYDROELECTRIC GENERATOR OR ALTERNATOR AND SYSTEM AND METHOD OF GENERATING ENDLESS AND UNINTERRUPTED ELECTRICITY USING GRAVITY WATER FLOW

There are no related applications.

This invention was not made pursuant to any federally-sponsored research and/or development.

THE FIELD OF INVENTION

The system, device and method of the present invention relate to utilizing gravity water flow from rivers and waterfalls to generate environmentally-friendly, abundant (nearly limitless in fact, so long as the water is flowing) electric energy. This Portable Hydroelectric Generator or Alternator may be installed in remote areas that now do not have a developed electrical grid or infrastructures, and the electric energy from the Portable Hydroelectric Generator or Alternator may be used to power both residential and commercial houses and buildings using a new grid line or an existing grid line.

BACKGROUND OF THE INVENTION

Thus, the system, device, and method of the present invention improve the accessibility to cheap, clean, and limitless electrical energy for thousands or hundreds of thousands of households and commercial installations.

The kinetic energy of flowing water has long been converted into mechanical and, later, electrical energy. For centuries, people have used the flowing water of rivers, waterfalls, and simply flowing streams of water to provide mechanical and electrical energy, starting with waterwheels powering flower mills and lumber mills for example. Hydropower, or hydroelectric power, was one of the first sources of energy used for generating electricity, first using waterwheels and later turbines. Currently, hydropower is generated from water moving from a higher elevation to a lower elevation, as occurs in rivers, but, first, the water is stored in a reservoir and then released. Also, hydropower may be generated under waterfalls. An exception is the Snoqualmie Waterfall (Washington State), where water from a high elevation is directed through a conduit in a sloping tunnel to generators placed at a lower point.

Large-scale hydropower plants can cause a loss of ecosystems in upstream and downstream rivers and a loss of land due to big reservoirs and dams. Projects can take years to plan and complete, are frequently very costly due to the necessity to dam and create reservoirs, and may have a limited lifespan of approximately 25 years for machinery and 50-100 years for civil works.

Although the International Energy Agency (IEA) considers hydropower among the least costly forms of renewable-power generation. Dams can cause environmental damage. The conventional dams prevent proper fish migration (including for spawning). Reservoir water is also low in oxygen and more stagnant that river water and it breeds algae and aquatic weeds. Therefore, there is a need for an improved hydropower solution that does not block water flow, does not require the construction of large, costly, and damaging dams, and does not require the creation of reservoirs. Thus, the impact of the device, system and method of the present invention on the surrounding environment and the wildlife is almost non-existent.

An example of an electrical generator using water flow are shown in U.S. Pat. No. 3,986,787, issued to William J. Mouton, Jr. et al., discloses a pair of river turbines below the water level, which are installed under a common float (two or more pontoons) carrying the electrical generating equipment. Mouton uses hinged "ailerons" to direct the water flow towards the turbines with shaped nozzles (impelling the water) and improve the generation of energy. Mouton discloses a trash screen in the form of the cone of cables attached to the turbines, and the tip of the cone is attached to an anchor cable leading from an upstream anchor.

US Patent Application Publication No. 2014/0191509 (David William Stauffer), discloses a waterfall hydroelectric generator, submerged entirely below water level. Stauffer discloses using a siphon pipeline and gravity for the production of hydroelectric power.

US Patent Application Publication No. 2015/0033722 (Michael Layton et al.) discloses a turbine system for generating power from a flow of liquid from an artificial waterfall. Layton's turbine system is designed to be anchored to a structure in the waterfall to generate power from the water flow. Layton discloses using a valve to modify and control the flow of liquid in the artificial waterfall.

US Patent Application Publication No. 2013/0088015 (Randal Walton) discloses a special barge with the space for a waterwheel on the stern of the barge, which is partially submerged into river. The electric generator is configured to generate electricity, when driven via the drive train by the waterwheel when it is rotated by the water. In some examples, the barge unit may include one or more anchors.

US Patent Application Publication No. 2022/0220932 (Sidney Schmidt) discloses the electric power generation device, where the electric energy is generated through the water flowing through the downpipes for rainwater collected from the roofs of buildings. The water spins the waterwheel encased in a housing adopted to allow the rainwater, which otherwise flows through the downspouts unimpeded, to pass through the housing and generate electricity.

However, none of these devices are particularly suitable for installation in remote areas and in different streams of water. The present invention addresses the need for mobile, portable electrical generator or alternator solution by providing a system, device and method of generating electricity for residential and commercial use through a grid line.

SUMMARY OF THE INVENTION

It is an object of the present invention to provide a system, device and method to generate electricity in remote locations, with portable mobile installations of generators or alternators pursuant to the disclosure of the present invention.

Generators/Alternators convert mechanical energy to alternating current or direct current. Depending on the application, the present invention may be used with either a Generator or an Alternator known in the art. Most applications and common household appliances use alternating current, so alternators may be more practical to use with the current invention.

This invention presents three embodiments of the Gaportsin Hydroelectric Generator/Alternator (GHG/A), which utilize gravity water flow. The first embodiment of GHG/A can be installed at any location along a river, or at multiple locations along the river using multiple GHG/A. This embodiment features a paddle wheel mounted on a Π-shaped platform supported by two pontoons. The pontoons may be made of plastic or aluminum, or they can be made of rubber (inflatable), which would save storage and transportation space. The Paddle Wheel is connected to a Gearbox and a Generator or Alternator by two Muffs for generating electricity. The support structure of this embodiment (the Π-shaped platform) must be secured to the riverbed using not less than three anchors and cables or ropes, connected to not less than three respective winches.

The second embodiment of GHG/A can be installed under a natural or artificial waterfall. This embodiment's design also includes a Paddle Wheel mounted on a Π-shaped Platform and two Pontoons. The Paddle Wheel connects to a Gearbox and Generator or Alternator by two Muffs for generating electricity. This support structure of this embodiment (the Π-shaped platform) must be secured to a rocky cliff using two Anchors and Cables or Ropes, connected to two pivoting winches on a cylindrical base.

The third embodiment of GHG/A is similar to the second embodiment, with the primary difference being that instead of pontoons to support the structure over a flowing body of water, a Π-shaped Frame is provided with four wheels when the water level beneath the structure is minimal.

All of these embodiments are relatively compact in size, inexpensive to manufacture and simple to assemble and install in any stream of water or under a waterfall. Many configurations may be used for the system, device and method of the present invention within the spirit and scope of the present invention. Although the examples and the preferred embodiments are shown primarily with water streams and waterfalls, the system, device and method of the present invention are equally applicable to other applications where fluid flow might be present.

BRIEF DESCRIPTION OF THE DRAWINGS

The teachings of the different embodiments of the present invention can be readily understood by considering the following detailed description in conjunction with the accompanying drawings of the various embodiments. A system, device and method to produce nearly limitless and uninterrupted, clean electric energy of the present invention will now be described by way of example with reference to the accompanying drawings in which:

FIG. 11 is a cross-sectional View E-E of the GNG/A from FIG. 2 described the design of Right Bearing Housing and connection it with Tube and Big Muff;

FIG. 11A is the enlarged view I from FIG. 11;

DESCRIPTION OF THE PREFERRED EMBODIMENT

Figure 1:
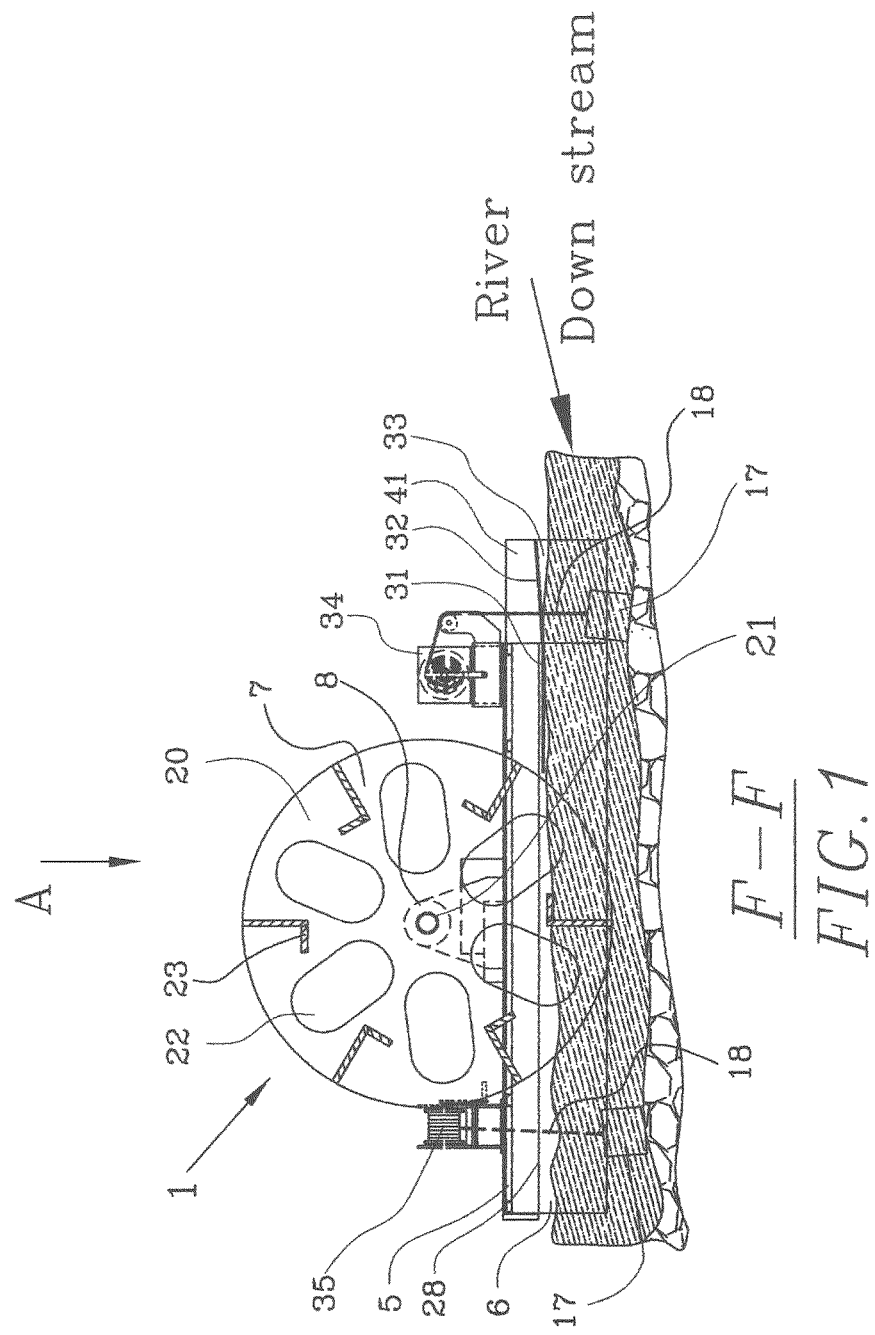
FIG. 1 is a side cross-sectional view F-F from FIG. 2, schematically showing the first embodiment of GHG/A, anchored to the bottom of a river and using gravity water flow in the river.
Figure 4:
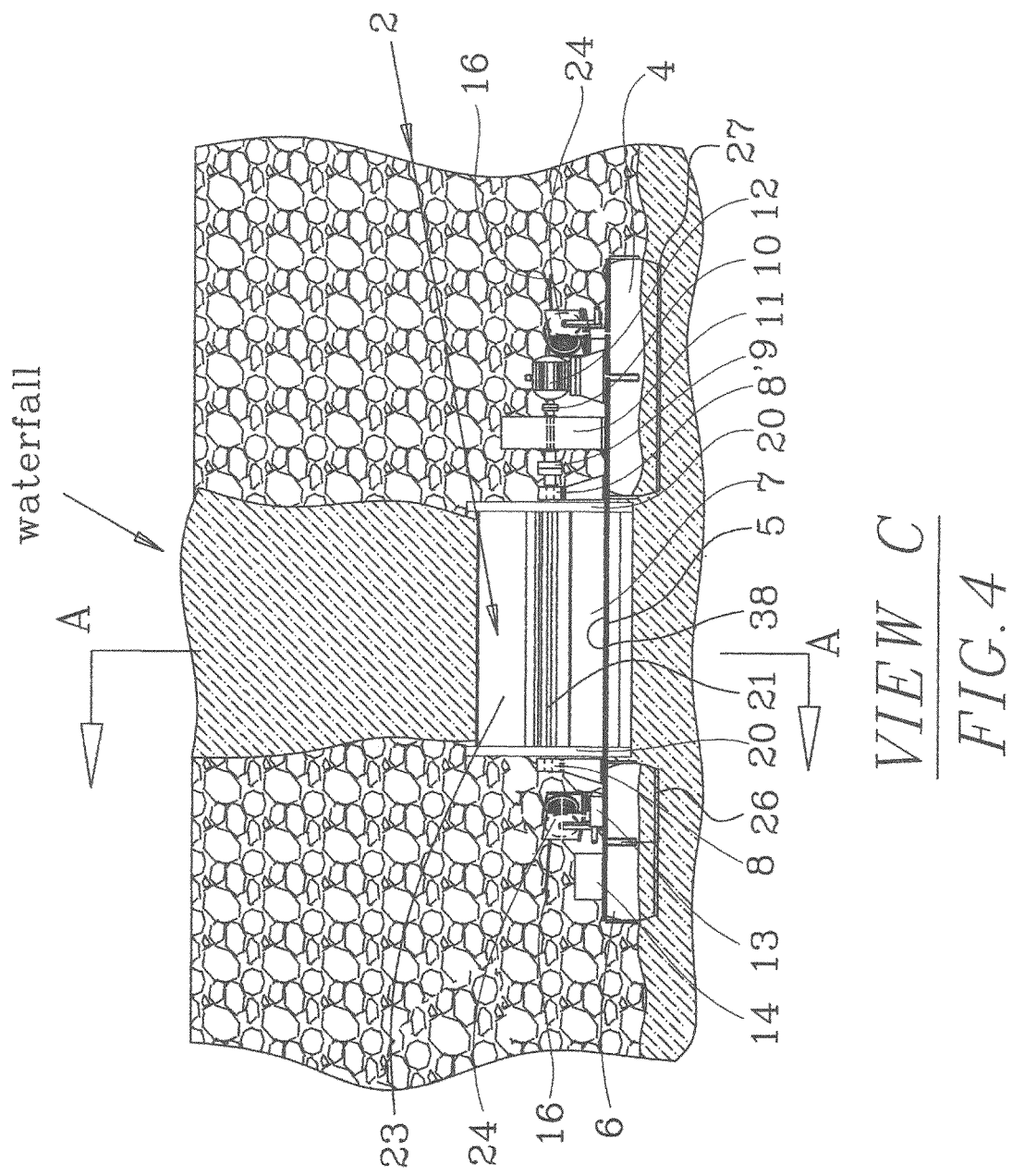
FIG. 4 is a back elevation view of the second embodiment of GHG/A—View C from FIG. 3 for use under a waterfall.

Referring to FIG. 1, the first embodiment of GHG/A is schematically shown, mounted on two pontoons: a narrow Pontoon 6 and a wide Pontoon 4 (not shown in this FIG. 1 because FIG. 1 is a side view, but the wide Pontoon 4, which is on the other side of the CHG/A is shown from the back in FIG. 4). The GHG/A includes a Paddle Wheel 7 mounted on a Π-Frame 5, based on pontoons 4 and 6. The Paddle Wheel 7 includes two sufficiently large Disks 20, which are substantially parallel to each other, and a Connection Tube 21, which connects the two Disks 20 at their respective centers.

The Pontoons are preferably as narrow as possible (i.e., the narrow Pontoon 6), but one of the pontoons (i.e., the wide Pontoon 4) may have to be wider because it is the base for the electrical generating equipment, which takes some space, as shown in the drawings. However, the pontoons can be the same size (width). This is a simple design consideration that can be addressed by the person skilled in the art or a skilled mechanical engineer.

Each Disk 20 preferably features Holes 22 for weight reduction, and the two Disks 20 are also connected by two or more L-Paddles 23. The optimal number of the L-Paddles 23 between the Disks 20 is five (5) or more. The materials from which the elements of the present invention can be made are any suitable modern materials (i.e., wood, aluminum, plastic, steel), and the specific design can be addressed by the person skilled in the art, depending on the location of the installation and the availability and the desired properties of the materials. The additional connections by the L-Paddles 23 give the Paddle Wheel 7 further strength and rigidity. It should be noted that the Holes 22 should be of approximately the same size and number on the two Disks 20, and preferably aligned, to ensure even weight distribution and the ability of the Paddle Wheel 7 to spin around the longitudinal axis of the Connection Tube 21.

The Paddle Wheel 7 is mounted on the two Bearing Housings 8 and 8'(Left Bearing Housing 8 and Right Bearing Housing 8'), enabling the Paddle Wheel 7 to spin freely around its longitudinal axis (which should coincide with the Connection Tube 21). The L-Paddles 23 catch the water flowing downstream, activating and spinning the Paddle Wheel 7.

Additionally, the GHG/A includes a Forward Winch 34, and two Back Winches 35, each used for moving Anchors 17 by Ropes 18 downward and/or upward. The Pontoons 6 and 4 have a Deep Water Line 28. The Deep Water Line 28 is the water line level when the specific embodiment of the GHG/A is fully-loaded with equipment and all of the components for generating and transmitting electrical power (i.e., the loaded weight). A Horizontal Plate 31 is placed between Pontoons 4 and 6, installed below the Deep Water Line 28. The Slope Plate 32, two Vertical Plates 41, and the Horizontal Plate 31 create a Venturi Flume 33 as also illustrated in FIG. 1 and FIG. 2.

A Venturi Flume is well known in the art, but to briefly summarize, a Venturi Flume looks like an hourglass in vertical cross-section: the Venturi Flume typically has a converging (narrowing) section, a throat, and a diverging (flaring) section. Venturi Flumes use the principle that the velocity of a fluid increases as the cross throat section of the container, and then the fluid flow decreases.

Figure 2:
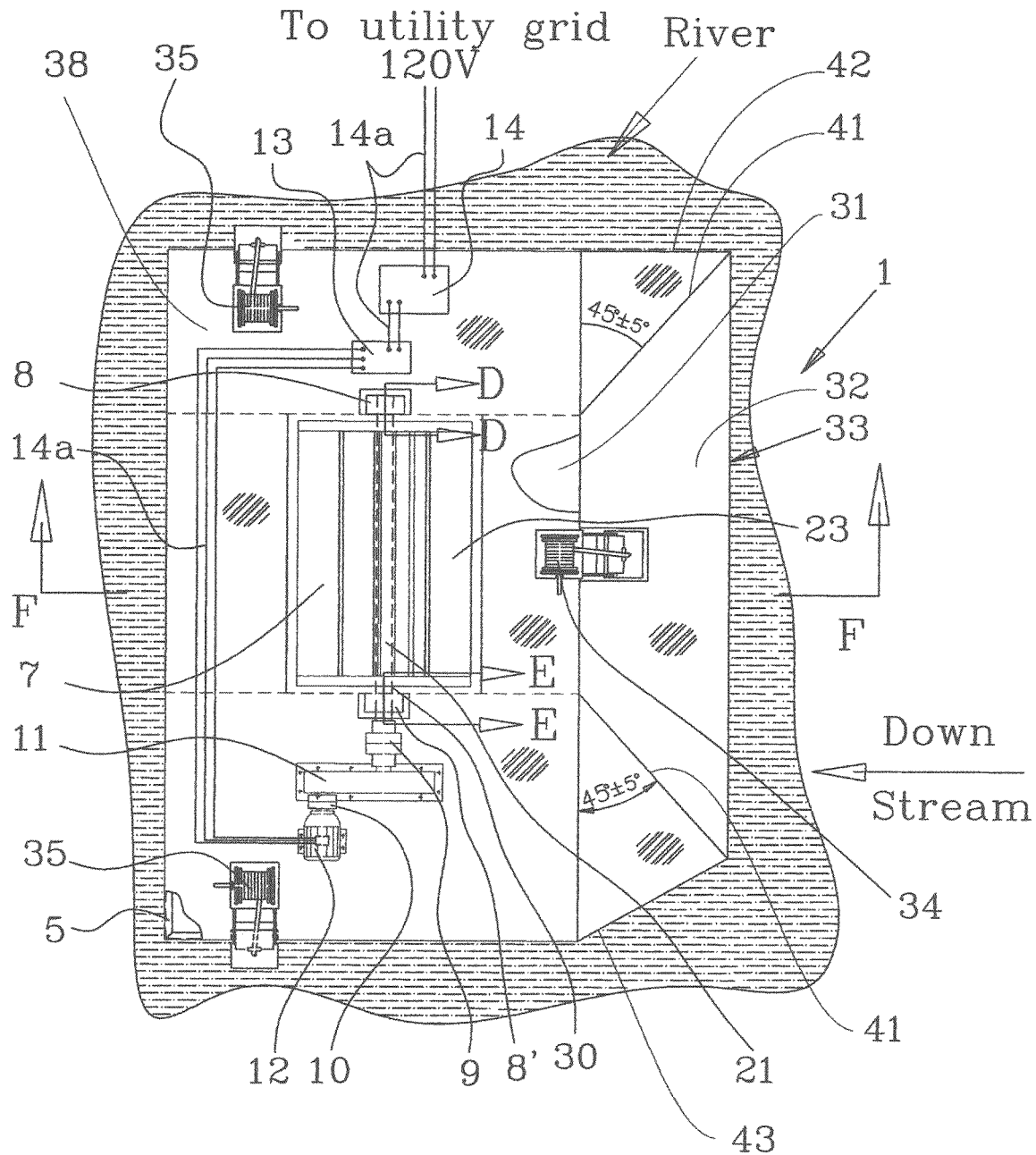
FIG. 2 is a top plan view of the first embodiment of GHG/A—View A from FIG. 1, illustrating its use in the river.

As illustrated in FIGS. 1-2, the Venturi Flume 33 (the converging part) directs the flow of water towards and under the Horizontal Plate 31 like a funnel, where the area under the Horizontal Plate 31 is essentially the throat of the Venturi Flume 33. The water flow speeds up as is passes through the narrowing section of the Venturi Flume 33 and under the Horizontal Plate 31, catching on the L-Paddles 23, activating and spinning the Paddle Wheel 7. Increasing the speed of the water flow under the Paddle Wheel 7 forces it to rotate faster, generating more electrical output.

Figure 12A:
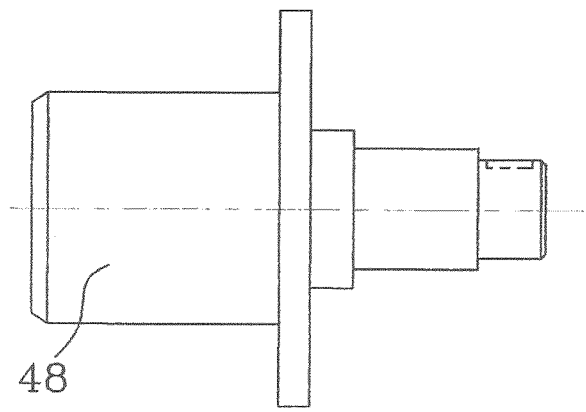
FIG. 12A is the side view of the one-piece Drive Shaft Insertion 48 of FIG. 11.
Figure 12B:
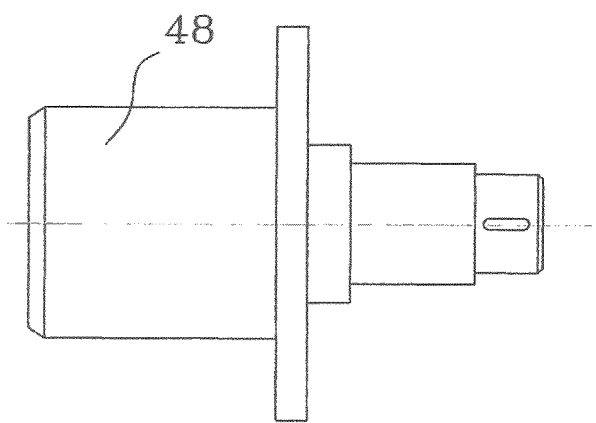
FIG. 12B is the top view of the one-piece Drive Shaft Insertion 48 of FIG. 11.
Figure 13:
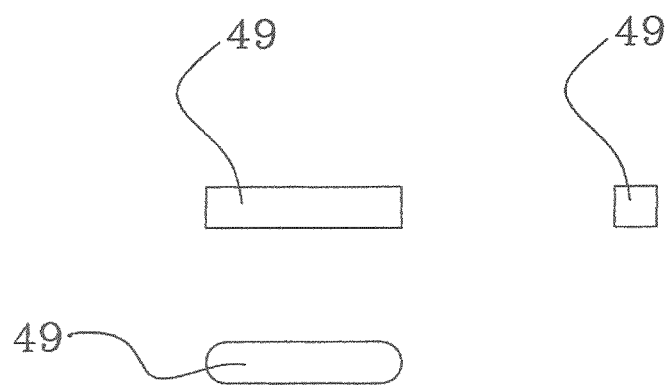
FIG. 13 are the top, side and front views of the Key 49 of FIGS. 11-11A.

Referring to FIG. 2, a plan view A from FIG. 1 of GHG/A is introduced, with the first embodiment 1 of the present invention. The Paddle Wheel 7 with L-Paddles 23 and Left Bearing Housing 8 and Right Bearing Housing 8' are installed and fixed by fasteners to a Metal Cover 38, which is mounted on top of the Π-Frame 5. The fasteners may be selected from a group consisting of fasteners for removable mounting such as latches, snaps, bolts or screws for example, or permanent mounting such as rivets for example, but fasteners are generally well-known in the art. A Drive Shaft Insertion 48 is connected to Gear Box 11 and Generator/Alternator 12 by two Muffs: a Big Muff 9 located between the Bearing Housing 8' and the Gear Box 11, and a Small Muff 10 located between the Gear Box 11 and the Generator/Alternator 12. Muff couplings and/or connections are well known in the art and require no additional description. Detailed connection of the Drive Shaft Insertion 48 with Bearing Housing 8' is illustrated in FIGS. 11 and 11A. FIG. 12A is the side view of the one-piece Drive Shaft Insertion 48 of FIG. 11. FIG. 12B is the top view of the one-piece Drive Shaft Insertion 48 of FIG. 11. FIG. 13 illustrates the top, side and front views of the Key 49 of FIGS. 11-11A.

Figure 10:
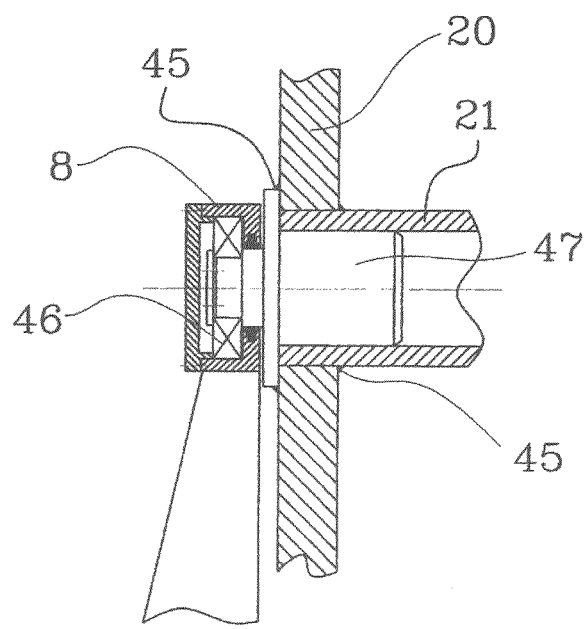
FIG. 10 is a cross-sectional View D-D of the GNG/A from FIG. 2 described the design of Left Bearing Housing and connection it with Tube.
Figure 10A:
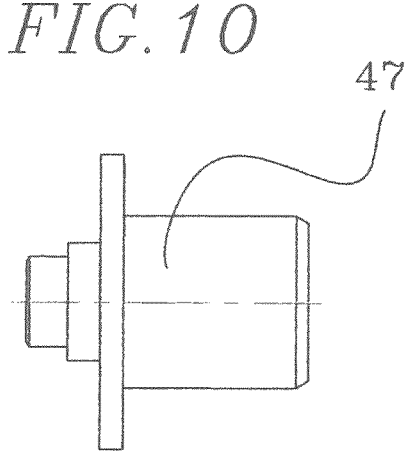
FIG. 10A is the separate view detail of the one-piece Insertion 47 of FIG. 10.

Referring to FIGS. 11 and 11A, the Drive Shaft Insertion 48 is located inside the Connection Tube 21, and the Drive Shaft Insertion 48 may be connected by Weld 45 to the Disk 20, and the Disk 20 is also welded to Tube 21 to ensure proper operation and the ease of connecting to the Bearing Housing 8' and interact with the Bearing 46. The Big Muff 9 is connected to the Drive Shaft Insertion 48 by Key 49. Referring to FIG. 10, Shaft Insertion 47 is welded to Disk 20, and Disk 20 is connected to Connection Tube 21 by Weld 45. End of Shaft Insertion 47, illustrated in FIG. 10 and FIG. 10A, is supported by the Bearing 46 inside the Bearing Housing 8.

The Generator/Alternator 12 is connected to Controller 13 and Inverter 14 by electrical Wires 14a. It should be noted that using an Alternator 12 is preferred because they are simpler and more reliable, but a Generator 12 may be used with the Inverter 14 (to provide AC power) and Controller 13 as the application may require. A typical inverter is a device or circuitry that changes direct current (DC) to alternating current (AC).

Tree winches are placed on the Metal Cover 38: a Forward Winch 34 and two Back Winches 35. A Horizontal Plate 31 is placed between Pontoons 4 and 6, installed below the Deep Water Line 28 plus between inner walls of pontoons 4 and 6, and also the Slope Plate 32, the lower end of which is connected to the Horizontal Plate 31 and the higher end of the Slope Plate 32 must be much higher than the Deep Water Line 28 plus two Vertical Plates 41 creates a Venturi Flume 33. A Venturi Flume is well-known in the art. The Venturi Flume typically has a converging (narrowing) section. In this application, Vertical Plates 41 create the converging section. Also, the Venturi Flume has a throat, which placed between Pontoons 4 and 6 and under the Horizontal Plate 31 and a diverging section is before contacting with Paddle Wheel 7. A Side Vertical Plate 42 and a Side Slope Vertical Plate 43 create a closed structure with the Vertical Plates 41 and the Metal Cover 38 or the Π-Frame 5, as applicable, for two reasons: first, to fix and make more rigid and sturdy the connection of the Vertical Plates 41, and, second, to close off the water flow so that it does not impact into the open corners or gaps, thus moving and destabilizing the device. Closing off the walls with the Side Vertical Plate 42 and the Side Slope Vertical Plate 43 essentially makes the device more hydrodynamically efficient.

The Vertical Plates 41 are preferably installed at a substantially 45 degree angle (plus or minus of up to 5 degrees) versus the front end of the Metal Cover 38. The difference between the Side Vertical Plate 42 and the Side Slope Vertical Plate 43 is dictated by the width of the pontoons 4 and 6, and the corresponding necessity for different angles, but if the pontoons are the same width, two Side Vertical Plates 42 may be used.

Figure 3:
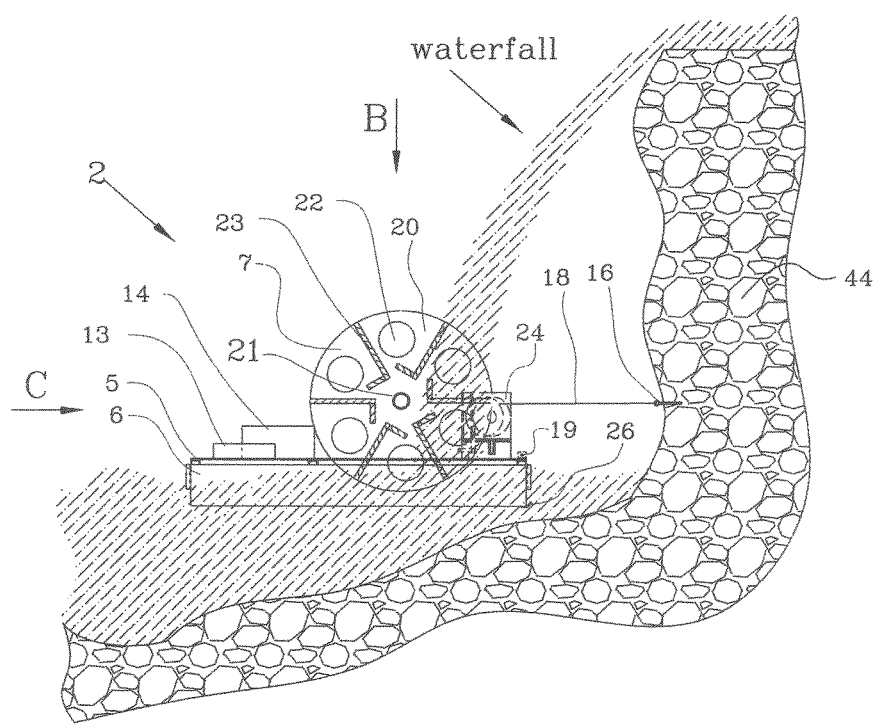
FIG. 3 is a side cross-sectional View A-A from FIG. 4 of the second embodiment of GHG/A for use under a waterfall.

Referring to FIG. 3, section A-A from FIG. 4 of the second embodiment 2 of the GNG/A is introduced, where a Paddle Wheel 7 has two Disks 20 with Holes 22 (the number of Holes 22 should preferably be equal the number of L-Paddles 23), and the Connection Tube 21. The Paddle Wheel 7 is mounted on the Π-Frame 5 and two Pontoons: one of the two is the Narrow Pontoon 6 and another is the Wide Pontoon 4 (see FIG. 4). Two Pontoons 4 and 6 are also rigidly connected by Rod 19. Two Pivoting Winches 24 is connected to Rocky Cliff 44 by two Anchors 16 and cables or Ropes 18.

The Narrow Pontoon 6 may be protected from damage by a Narrow Ski 26, which is rigid and/or resistant to sharp objects and damage. The Narrow Ski 26 is attached to the Narrow Pontoon 6. The Narrow Ski 26 is a bumper or buffer that protects the Narrow Pontoon 6 from the rocky bottom (especially if the Narrow Pontoon 6 is inflatable rubber, which is prone to tearing on sharp bottom rocks). The device is moved by two Pivoting Winches 24 positioning the Paddle Wheel 7 under Waterfall. Each Disk 20 has Holes 22 for weight reduction; note that the Holes 22 are shown to be circular in FIG. 3 versus oval hole in FIG. 1, but the Holes 22 may be of any suitable shape. The Controller 13 and Inverter 14 are also mounted on the Π-Frame 5.

Referring to FIG. 4, view C from FIG. 3 of the second embodiment 2 of GHG/A is introduced. The second embodiment of GHG/A includes a Paddle Wheel 7 with Left Bearing Housings 8 and Right Bearing Housing 8', mounted on the Π-Frame 5, covered by the Metal Cover 38, and supported by Narrow Pontoon 6 and Wide Pontoon 4. Paddle Wheel 7 is connected to Gear Box 11 and the Generator/Alternator 12 by the Big Muff 9 and the Small Muff 10. Two anchors 16 and two Pivoting Winches 24 secure GHG/A in a stable position under Waterfall. The Paddle Wheel 7 has two Disks 20, connected by the L-Paddles 23 and the Connection Tube 21. The Narrow Pontoon 6 is protected by the Narrow Ski 26 and the Wide Pontoon 4 is protected by the Wide Ski 27, similar in purpose, design, attachment and function to the Narrow Ski 26. The Controller 13 and the Inverter 14 are set up on the Π-Frame 5, covered by the Metal Cover 38.

Figure 5:
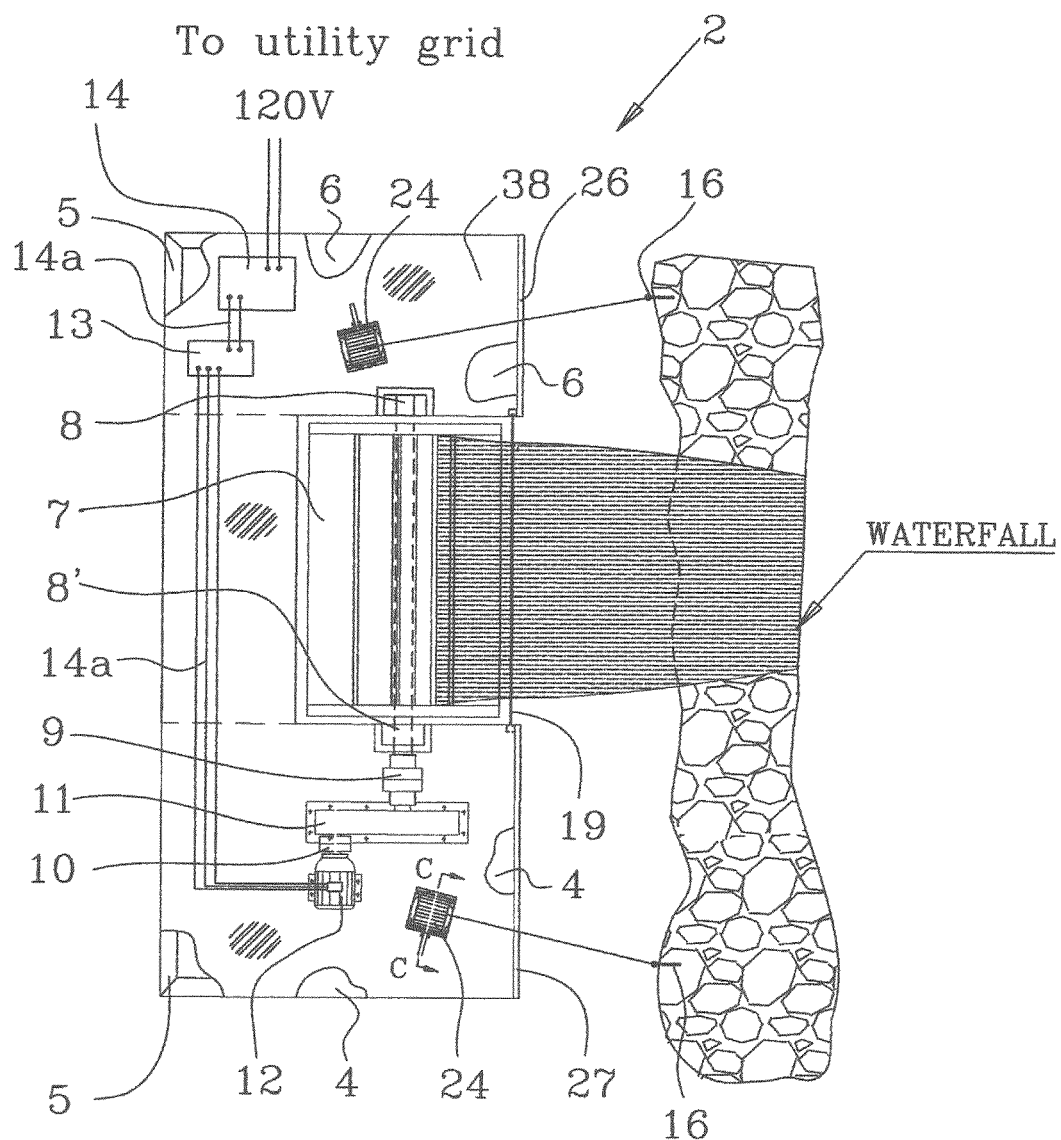
FIG. 5 is a top plan view of the second embodiment of GHG/A—View B from FIG. 3 for use under a waterfall.

Referring to FIG. 5 (View B from FIG. 3), the second embodiment 2 of GHG/A is introduced, which includes a Paddle Wheel 7 with Left Bearing Housings 8 and Right Bearing Housing 8' mounted on the Π-Frame 5, covered by the Metal Cover 38, and supported by the Narrow Pontoon 6 and the Wide Pontoon 4. The Paddle Wheel 7 is connected to the Gear Box 11 and Generator/Alternator 12 by the Big Muff 9 and the Small Muff 10. Two Anchors 16 and two Pivoting Winches 24 secure GHG/A in a stable position under Waterfall. The Generator/Alternator 12 is connected to the Controller 13 and the Inverter 14 by electrical Wires 14a. Two Pontoons 4 and 6 are connected by the Π-Frame 5 and rigidly connected by Rod 19. Narrow Ski 26 and Wide Ski 27 protect the Narrow Pontoon 6 and the Wide Pontoon 4 respectively.

Figure 6:
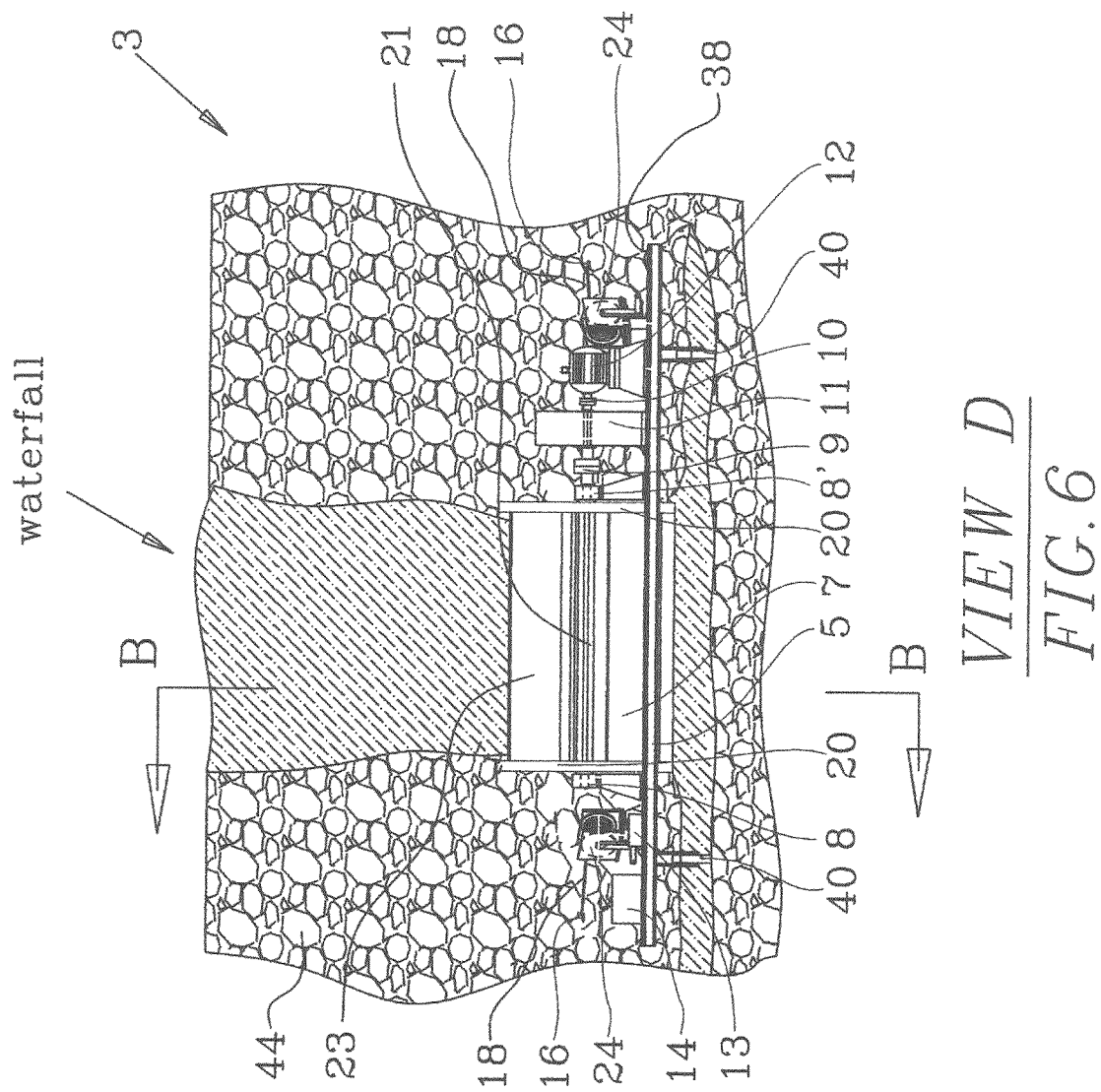
FIG. 6 is a back elevation view of the third embodiment of GHG/A with wheels—View D from FIG. 7 for use under a waterfall.
Figure 7:
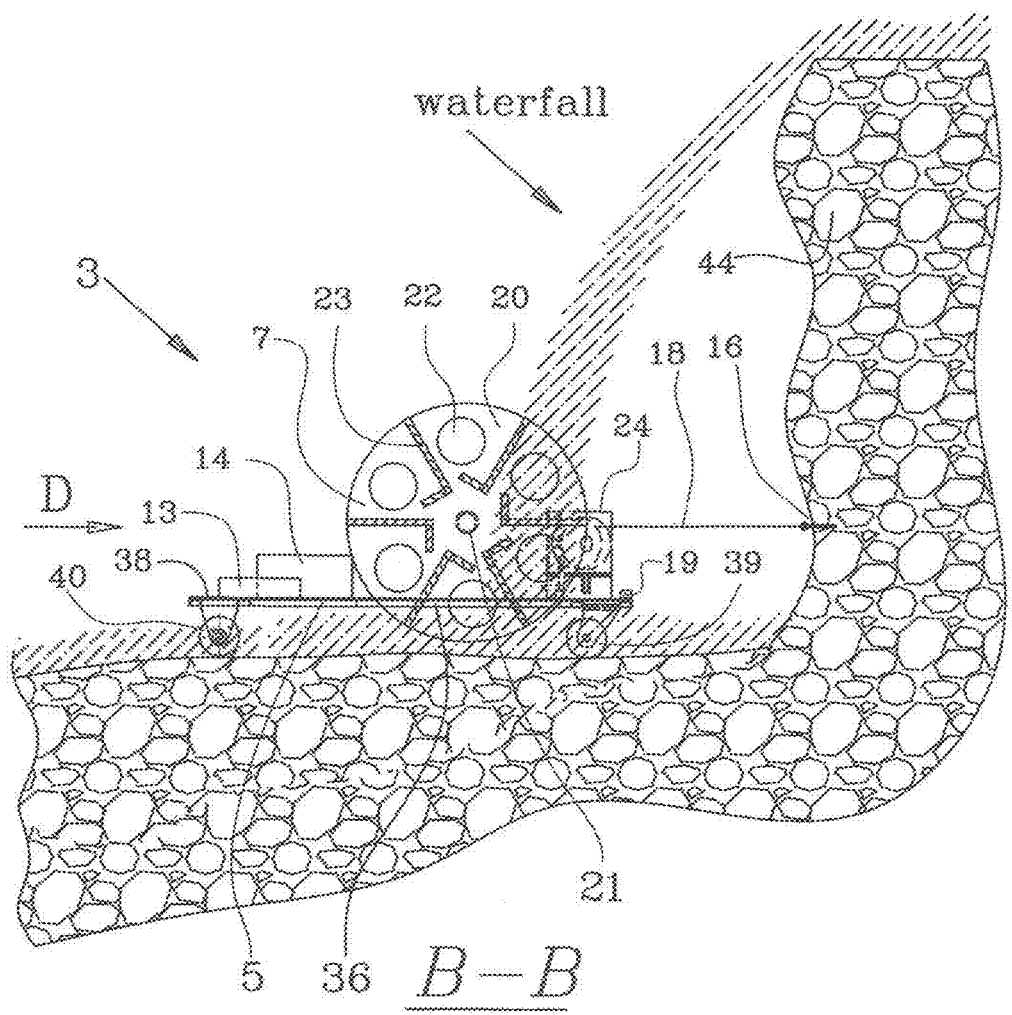
FIG. 7 is a side cross-sectional View B-B from FIG. 6 of the third embodiment of GHG/A with wheels for use under a waterfall.

FIG. 6 is View D from FIG. 7, introducing the third embodiment 3 of the GHG/A. The third embodiment 3 includes a Paddle Wheel 7 with Left Bearing Housing 8 and Right Bearing Housing 8', mounted on Π-Frame 5, which is covered by the Metal Cover 38. The entire structure has four wheels connected to the bottom part of the Π-Frame 5: two Back Wheels 40 and two Forward Pivoting Wheels 39 (not shown in FIG. 6 but shown in FIG. 7). The Paddle Wheel 7 is connected to the Gear Box 11 and the Generator/Alternator 12 by the Big Muff 9 and the Small Muff 10. Two Pivoting Winches 24 are connected to the Rocky Cliff 44 by the Anchors 16 and Winch Rope 18. The two Pivoting Winches 24 are also connected to a Cylindrical Stand 29 by a Pivot 25, which inserts into the Cylindrical Stand 29. The Generator/Alternator 12 is connected to Controller 13 and Inverter 14 by electrical wire 14a. The two Disks 20 of Paddle Wheel 7 are connected to each other by the L-Paddles 23 and the Connection Tube 21. Two back wheels 40 and two forward pivoting wheels 39 are attached to the legs 36 at the bottom part of the Π-frame 5.

FIG. 7 is a section B-B from FIG. 6, showing the third embodiment 3 of GHG/A. Paddle Wheel 7 is mounted on a Π-Frame 5. Two Pivoting Winches 24 are connected to Rocky Cliff 44 by Anchors 16 and Ropes 18. The entire structure has four wheels: two Back Wheels 40 and two Forward Pivoting Wheels 39. Paddle Wheel 7 has two Disks 20, the Connection Tube 21, and six L-Paddles 23. Each Disk 20 has Holes 22 for weight reduction. The Controller 13 and the Inverter 14 are set up on the Π-Frame 5. In this embodiment, the Π-Frame 5 may be made of metal, but it may also include a separate Metal Cover 38 on which the Controller 13 and the Inverter 14 are located. The two legs 36 of the Π-Frame 5 are connected by the Tie Rod 19. This is preferable to give some strength and rigidity to the structure of the Π-Frame 5 because the front of the Π-Frame 5 is open.

Figure 8:
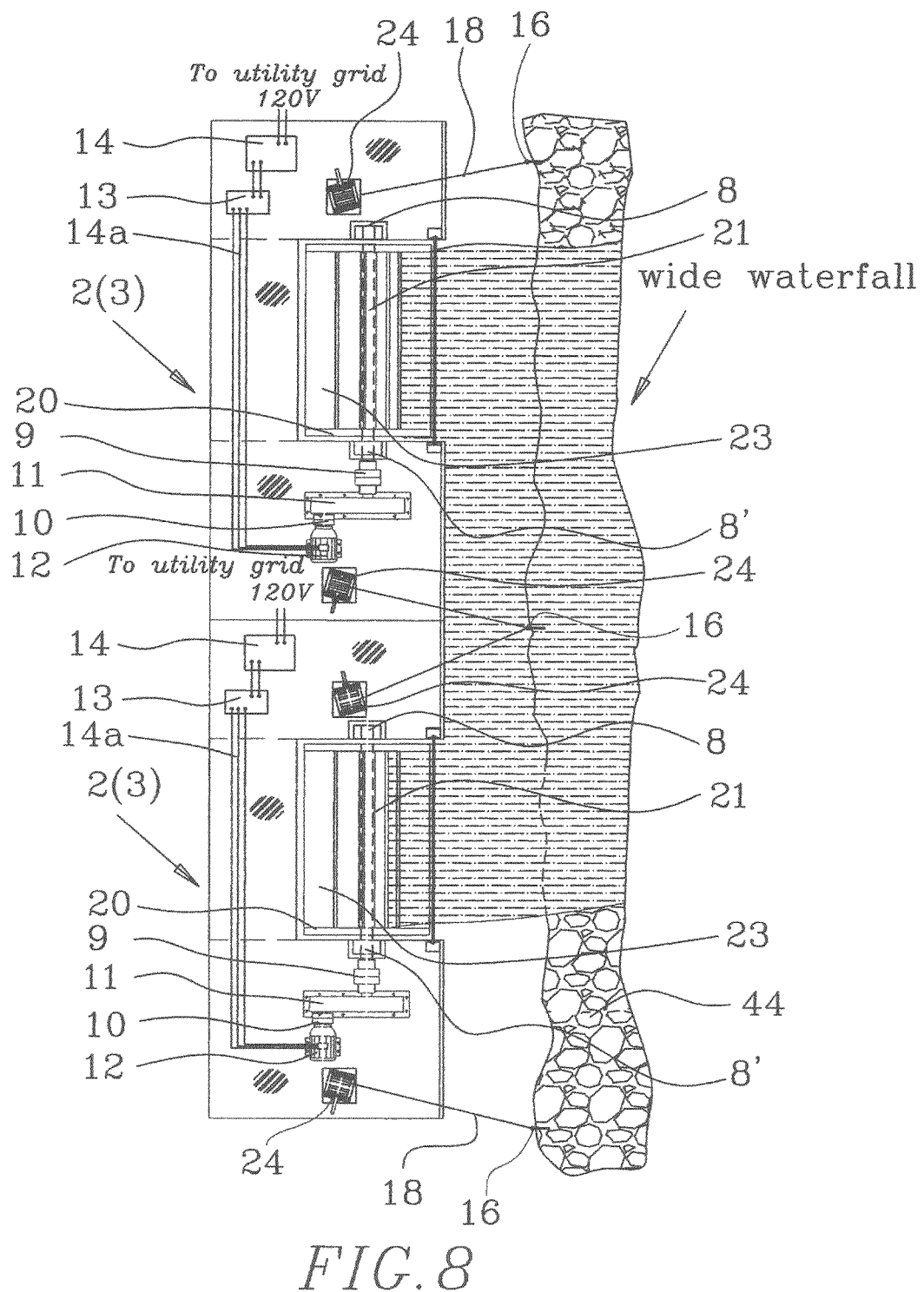
FIG. 8 is a top plan view of a chain of the second or third embodiments—two GHG/A for use under a wide waterfall.

FIG. 8 illustrates the possibility of using a chain of GHG/A units when a waterfall is wide. Different embodiments of the present invention in a chain (i.e., the second embodiment or the third embodiment pursuant to the disclosure of this invention), could be used for this purpose. FIG. 8 also demonstrates the Rocky Cliff 44, the Anchors 16, the Winch Ropes 18, and the Pivoting Winches 24. Also illustrated in FIG. 8 are the Left Bearing Housings 8 and Right Bearing Housing 8', Connection Tube 21, L-Paddles 23, Inverter 14, Controller 13, Electrical Wires 14a, Disk 20, Big Muff 9, Small Muff 10, Gear Box 11, and Generator/Alternator 12.

Figure 9:
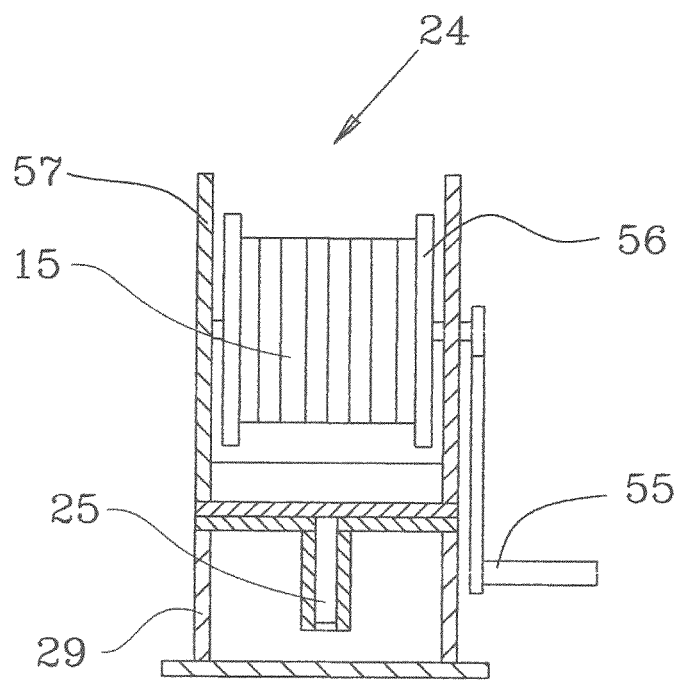
FIG. 9 is a cross-sectional View C-C from FIG. 5 of the GHG/A's pivoting winch connected to a Cylindrical Stand by a pivot.

FIG. 9 is section C-C from FIG. 5 and demonstrates the design of the Pivoting Winch 24, which includes a drum 56 with Rope 15, a Pivot 25, and a Cylindrical Stand 29. The drum is housed in a housing 57, which cooperates with the Pivot 25 in the cylindrical pivoting Stand 29 to turn the Winch 24 as needed. The drum 56 is actuated by the hand crank 55, to tighten or loosen the rope 15 depending on the anchoring depth or distance.

FIG. 10 is section D-D from FIG. 2 where the following elements are illustrated: Left Bearing Housing 8, Disk 20, Connection Tube 21, Insertion 47, Weld 45, Bearing 46. FIG. 10A is the separate view detail of the one-piece Insertion 47 of FIG. 10.

FIG. 11 is section E-E from FIG. 2 that illustrates the Right Bearing Housing 8', Big Muff 9, Disk 20, Connection Tube 21, Drive Shaft Insertion 48, Key 49, Weld 45, and Bearing 46.

FIG. 11A illustrates the large-scale Big Muff 9 and Key 49. FIGS. 12A and 12B illustrate the side and top views of the one-piece Drive Shaft Insertion 48 of FIG. 11. FIG. 13 illustrates the Key 49 in three views.

Further ideas or embodiments of the present invention may include:

a. a portable hydroelectric generator or alternator and method of generating nearly limitless, uninterrupted, ecologically-clean electricity using gravity water flow;

b. a portable hydroelectric generator or alternator, comprising a paddle wheel, gearbox, and generator or alternator mounted on two pontoons and fixed to the bottom of the river by three anchors, which one placed forward along symmetric axis of paddle wheel and two placed back from each side;

c. a portable hydroelectric generator or alternator, comprising a Π-frame and Π-metal cover set up on pontoons, including a horizontal plate that ties two pontoons and is placed below the deep waterline of the pontoons and joined with a slope plate, the upper end of which must be higher than the deep waterline of the pontoons; additionally, two vertical plates placed before the pontoons and angled to the axis of the pontoons create a wider inlet, together forming the Venturi Flume;

d. a portable hydroelectric generator or alternator, comprising a paddle wheel, gearbox, and generator or alternator mounted on two pontoons and fixed to a rocky cliff under a waterfall by two anchors and two pivoting winches, suitable for use when the water level beneath the pontoons is sufficient;

e. a portable hydroelectric generator or alternator, wherein the two pontoons are provided with two skis, placed forward and under the bottom of the pontoons for secured the edge of pontoons;

f. a portable hydroelectric generator or alternator, comprising a paddle wheel, gearbox, and generator or alternator mounted on a Π-metal frame, which is provided with two forward pivoting wheels and two non-pivoting wheels on the back; this structure is fixed to a rocky cliff under a waterfall by two anchors and two pivoting winches, suitable for use when the water level beneath the structure is low.

g. a portable hydroelectric generator or alternator adaptable for use with wide waterfalls by creating a chain of multiple units;

h. a portable hydroelectric generator or alternator, wherein each pivoting winch has a pivot that inserts into a round cylindrical base;

i. a portable hydroelectric generator or alternator wherein each L-paddle in the horizontal position under waterfall bent up of inner-side edge;

j. a portable hydroelectric generator or alternator wherein inner-side edge of each paddle in the low vertical position bent forward to meet water stream of the river.

It will be understood by those skilled in the art that each of the embodiments described above and their various combinations may also find useful applications in other types of constructions differing from the embodiments described above. While the invention has been illustrated and described above, it is not intended to be limited to the details shown, as various modifications and structural changes may be made to these embodiments without departing in any way from the spirit or scope and the subject matter of the present invention. Therefore, the true scope of the invention should not be limited by the above mentioned description of the preferred embodiments since other modifications may become apparent to those skilled in the art upon a study of the drawings, description, explanations, and specifications herein.

What is claimed is:

1. A device for generating hydroelectric power in a water stream, comprising:
   a. a Π-Frame supported by a plurality of pontoons;
   b. a metal cover mounted on top of the Π-Frame;
   c. a paddle wheel having two disks substantially parallel to each other and connected by a connection tube at respective centers of the two disks and by a plurality of L-shaped paddles, wherein the paddle wheel is mounted on a left bearing housing and a right bearing housing at a height relative to the water stream that permits the plurality of L-shaped paddles to be actuated by the water stream below the surface of the water stream, said left bearing housing and said right bearing housing being attached to the metal cover by cooperating fasteners;
   d. a generator or alternator connected through a gear box to a drive shaft longitudinally disposed inside the connection tube and a big muff and connected to the connection tube by a key; and
   e. a forward winch mounted forward on the metal cover along a symmetric axis of the paddle wheel and two back winches mounted rearward on each side of the metal cover, each said winch being used for moving upward or downward a respective anchor attached to each said winch by a cable or rope, wherein the device for generating hydroelectric power is secured to a bottom of the water stream by the respective anchors and wherein hydroelectric power is generated when the water stream actuates the plurality of L-shaped paddles.

2. The device for generating hydroelectric power of claim 1, wherein
   the plurality of pontoons are a narrow pontoon and a wide pontoon.

3. The device for generating hydroelectric power of claim 2,
   wherein the narrow pontoon and the wide pontoon include a deep water line, further comprising a horizontal plate mounted below the deep water line between the narrow pontoon and the wide pontoon, a slope plate attached to the horizontal plate, and two vertical plates connecting the horizontal plate and the slope plate, wherein the combination of the horizontal plate, the slope plate, and the two vertical plates create a Venturi flume for improving the electrical output of the device for generating hydroelectric power.

4. The device for generating hydroelectric power of claim 3, further comprising the two vertical plates, a side vertical plate, and a side slope vertical plate creating a closed structure to channel water flow so that the plates do not impact into open corners or gaps.

5. The device for generating hydroelectric power of claim 2, further comprising a narrow ski placed forward and under a bottom of the narrow pontoon and a wide ski placed forward and under a bottom of the wide pontoon for securing edges of the narrow pontoon and the wide pontoon.

6. The device for generating hydroelectric power of claim 1, wherein the drive shaft is connected to the gear box by the big muff disposed between the right bearing housing and the gear box and the generator or alternator is connected to the gear box by a small muff disposed between the generator or alternator and the gear box.

7. The device for generating hydroelectric power of claim 6, wherein the big muff is connected to a drive shaft insertion by the key and the drive shaft insertion is welded to one of the two disks, said one of the two disks being connected to the connection tube by a weld.

8. The device for generating hydroelectric power of claim 1, wherein the plurality of L-shaped paddles is five or more L-shaped paddles.

9. The device for generating hydroelectric power of claim 1, wherein each of the plurality of L-paddles in a horizontal position includes an inner-side edge bent upwards.

10. The device for generating hydroelectric power of claim 1, wherein each pivoted winch is used to tighten or loosen the cable or rope consistently with an anchoring depth and direction.

11. A device for generating hydroelectric power under a waterfall, comprising:
    a. a Π-Frame supported by a plurality of pontoons rigidly interconnected by a rod therebetween;
    b. a metal cover mounted on top of the Π-Frame;
    c. a paddle wheel having two disks substantially parallel to each other and connected by a connection tube at respective centers of the two disks and by a plurality of L-shaped paddles, wherein the paddle wheel is mounted on a left bearing housing and a right bearing housing, said left bearing housing and said right bearing housing being attached to the metal cover by cooperating fasteners;
    d. a generator or alternator connected through a gear box to a drive shaft longitudinally disposed inside the connection tube and a big muff and connected to the connection tube by a key; and
    e. a pair of pivoting winches mounted forward on lateral sides of the metal cover, each said winch being used for connecting to a cliff or wall with a respective anchor attached to each said winch by a cable or rope, wherein the device for generating hydroelectric power is secured to the cliff or wall by the respective anchors and wherein hydroelectric power is generated when the waterfall actuates the plurality of L-shaped paddles.

12. The device for generating hydroelectric power of claim 11, wherein each of the pair of pivoting winches is mounted on a cylindrical stand and used to tighten or loosen the cable or rope consistently with an anchoring distance.

13. A device for generating hydroelectric power under a waterfall, comprising:
    a. a Π-Frame having two legs rigidly interconnected by a tie rod therebetween, each leg having a forward pivoting wheel attached to a bottom part of each leg and two back wheels attached to a bottom part of the Π-Frame;

b. a paddle wheel having two disks substantially parallel to each other and connected by a connection tube at respective centers of the two disks and by a plurality of L-shaped paddles, wherein the paddle wheel is mounted on a left bearing housing and a right bearing housing, said left bearing housing and said right bearing housing being attached to the Π-Frame by cooperating fasteners;

c. a generator or alternator connected through a gear box to a drive shaft longitudinally disposed inside the connection tube and a big muff and connected to the connection tube by a key; and d. a pair of pivoting winches mounted forward on lateral sides of the Π-Frame, each said winch being used for connecting to a cliff or wall with a respective anchor attached to each said pivoting winch by a cable or rope, wherein the device for generating hydroelectric power is secured to the cliff or wall by the respective anchors and wherein hydroelectric power is generated when the waterfall actuates the plurality of L-shaped paddles.

\* \* \* \* \*